US007513250B2

(12) United States Patent
Head et al.

(10) Patent No.: US 7,513,250 B2
(45) Date of Patent: Apr. 7, 2009

(54) POSITIONING SYSTEM FOR PORTABLE SOLAR PANELS

(76) Inventors: Ray Head, 7247 NE. Beach Ave., Poulsbo, WA (US) 98370; Cindy S. Head, 7247 NE. Beach Ave., Poulsbo, WA (US) 98370

( * ) Notice: Subject to any disclaimer, the term of this patent is extended or adjusted under 35 U.S.C. 154(b) by 44 days.

(21) Appl. No.: 11/590,519

(22) Filed: Oct. 31, 2006

(65) Prior Publication Data
US 2007/0039610 A1 Feb. 22, 2007

Related U.S. Application Data

(63) Continuation-in-part of application No. 11/026,205, filed on Dec. 30, 2004, now abandoned.

(60) Provisional application No. 60/538,834, filed on Jan. 23, 2004.

(51) Int. Cl.
*F24J 2/38* (2006.01)
(52) U.S. Cl. ..................... 126/605; 126/600
(58) Field of Classification Search .............. 126/572, 126/573, 600, 605, 606; 245/91; 254/91
See application file for complete search history.

(56) References Cited

U.S. PATENT DOCUMENTS

| | | | | |
|---|---|---|---|---|
| 3,220,698 A | * | 11/1965 | Carder | 254/2 B |
| 3,317,004 A | * | 5/1967 | Harrison, Jr. | 254/91 |
| 3,865,214 A | | 2/1975 | Clark et al. | |
| 4,145,021 A | * | 3/1979 | Gaechter et al. | 248/371 |
| 4,178,913 A | * | 12/1979 | Hutchison | 126/601 |
| 4,376,372 A | * | 3/1983 | English, Jr. | 60/641.15 |
| 4,452,234 A | | 6/1984 | Withjack | |
| 4,476,853 A | * | 10/1984 | Arbogast | 126/578 |
| 4,630,791 A | * | 12/1986 | Chapman | 244/172.6 |
| 4,730,602 A | | 3/1988 | Posnansky et al. | |
| 5,022,929 A | | 6/1991 | Gallois-Montbrun | |
| 5,322,143 A | * | 6/1994 | Curran | 187/211 |
| 5,340,082 A | | 8/1994 | Holloway | |
| 5,379,753 A | | 1/1995 | Noennich | |
| 5,542,203 A | | 8/1996 | Luoma et al. | |
| 5,905,356 A | | 5/1999 | Wells | |
| 5,969,501 A | | 10/1999 | Glidden et al. | |
| 6,046,399 A | | 4/2000 | Kapner | |
| 6,123,067 A | | 9/2000 | Warrick | |
| 6,396,239 B1 | * | 5/2002 | Benn et al. | 320/101 |
| 6,552,257 B1 | * | 4/2003 | Hart et al. | 136/246 |
| 6,563,040 B2 | | 5/2003 | Hayden et al. | |
| 6,974,123 B2 | * | 12/2005 | Latvys | 254/122 |

* cited by examiner

*Primary Examiner*—Kenneth B Rinehart
*Assistant Examiner*—Chuka C Ndubizu
(74) *Attorney, Agent, or Firm*—Dowrey & Associates

(57) ABSTRACT

A solar panel(s) positioning apparatus for controlling the orientation of a solar panel(s) having one edge pivotally mounted to a support surface including a lift bar attached to an opposite edge of the panel(s) and having a mast, a base supported on the support surface, a swing link connected between the base and the mast and an extensible link pivotally connected between an intermediate point on the base end of the mast. A modification of the structure includes positioning apparatus for alternate bidirectional tilting of one or more panels about axes along aligned opposite side edges thereof.

25 Claims, 10 Drawing Sheets

POSITIONING SYSTEM FOR PORTABLE SOLAR PANELS

CROSS REFERENCE TO RELATED APPLICATIONS

The present application is a continuation-in-part of my copending application, filed Dec. 30, 2004, Ser. No. 11/026,205, claiming the benefit under 35 U.S.C. 119(e) of U.S. Provisional Patent Application Ser. No. 60/538,834 filed Jan. 23, 2004.

BACKGROUND

1. Field of the Invention

The present invention relates generally to apparatus for controlling the positioning of solar panels which may be arranged independently or in groups or arrays. More particularly, the present invention relates to positioning apparatus for controlling the orientation of a solar panel(s) of the type normally mounted on motor homes, trailers and the like with the positioning system being controllable from a remote location, either inside or outside of the vehicle.

2. Description of the Prior Art

It has become customary to mount a solar panel or an array of such panels on the rooftop of vehicles such as motor homes, trailers and the like. In the prior art, orientation of the solar panel, for the purpose of collecting solar rays, normally requires some type of manual manipulation, usually from a ladder or by actually climbing onto the vehicle roof. Such positioning systems are usually very rudimentary and often involve manually adjustable braces or the like connected between the solar panel and the vehicle roof. An example of such an arrangement is disclosed in U.S. Pat. No. 5,969,501 to Glidden et al. Alternatively hand crank operated panel lifting apparatus has been utilized to position motor vehicle roof-mounted solar panels. U.S. Pat. No. 5,379,753 to Noennich illustrates a device of this type. In the latter instance, crank elements are mounted so as to extend through the roof of the vehicle, allowing a person within the vehicle to operate a hand crank so as to position the solar panel. This arrangement, of course, requires openings to be made in the vehicle roof as an after market installation which may result in leakage problems or other structural damage to the motor vehicle or trailer. A need thus arises for a remotely controllable power unit and mounting operable either from within or without the vehicle to position solar panels. The positioning apparatus must be compact and otherwise adaptable to the motor home or other vehicle roof structure and must be acceptable in appearance and compatibility with the vehicle structure.

SUMMARY OF THE EMBODIMENTS

A single solar panel, or more commonly an array of two or more solar panels, may be mounted on the vehicle roof usually carried in a more or less flat generally horizontal non-use position on the roof surface. In order for the generally flat panels to be moved from the horizontal position and oriented to the in-use position at a given angle in a given direction to the roof surface, they may be pivoted or hinged along one lateral edge relative to the vehicle roof surface. An elongated base structure is anchored to the vehicle roof surface adjacent to the lateral edge of the panel(s) which extends at right angles to the hinged edge. A mast structure is connected to a lift bar which is fixed to the lateral edge(s) of the panel(s) opposite the hinged edge(s) to form a lift structure to raise the panel(s) by pivoting about the hinged edge. One end of the base structure is connected to the mast by means of a swing arm or swing arms which extend between the mast structure and a pivot point adjacent to the end of the base structure which is in alignment with the pivotal axis of the panel edge. The swing arm or arms may be connected adjacent the top end of the mast or intermediate the top and bottom ends thereof. A motor driven extensible link or arm is pivoted at one end to the base structure intermediate the ends of the base. The opposite end of the extensible link is pivotally connected to the mast either above or below the pivotal connection of the swing arms. In an alternate embodiment, a single solar panel or a plurality of in-line panels are mounted for selective tilting about an axis parallel to one or the opposite lateral edges for orienting the panels either clockwise or counterclockwise in opposite directions of tilt. In this manner the panels may be tilted so as to optimize the collection of solar rays, depending on the direction in which the vehicle is parked. In this embodiment, the panel or panels are typically connected along one lateral edge to a cross bar structure which is itself pivotally connected to a pivotal bracket located along the opposite lateral edge of the panel. Separate extensible links or arms are pivotally connected to the opposite lateral edges of the panels by means of articulated mast structures with the extensible links being pivoted at their opposite ends to a base structure fixedly mounted on the vehicle roof. Swing arms or links are also connected between the mast and base structures to cause raising of the panels when the extensible links are actuated. In the present illustrated embodiments, the extensible links are disclosed by way of example as motor driven screw jacks. It will be understood that the type of extensible links, the structural details and the mode of operation may be chosen from any number of equivalent extensible link devices. With this arrangement, the extensible link power units may be extended to raise the swing links and cause the panel(s) to pivot about their axis to orient the panel(s) for catching solar rays. In the non-use position of the panel(s), only the mast structures remain upstanding and may be kept to an acceptable design height above the vehicle roof surface.

DETAILED DESCRIPTION OF THE PREFERRED EMBODIMENTS

Figure 1:
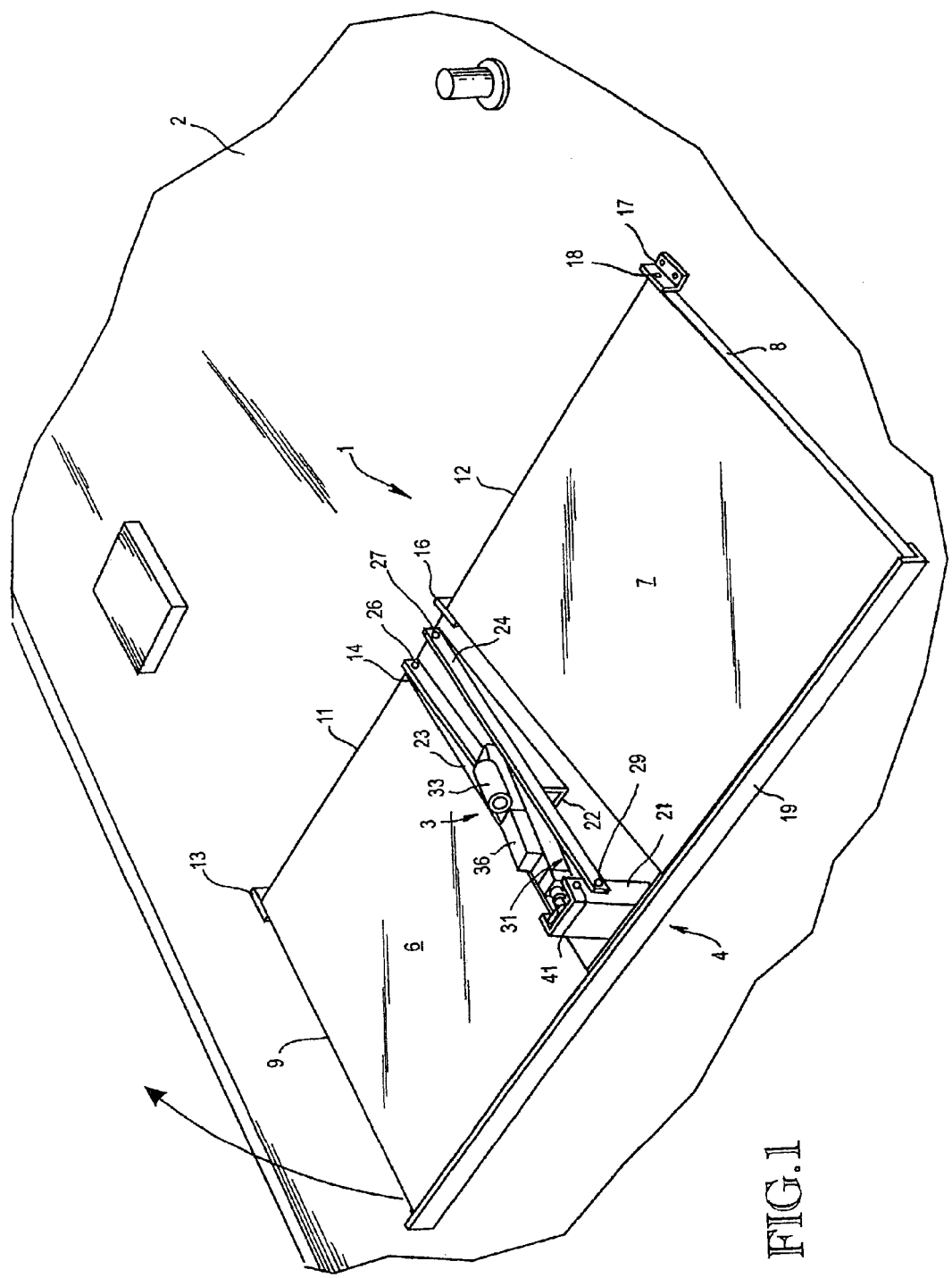
FIG. 1 is a perspective view of the panel positioning apparatus mounted on the roof of a motor vehicle.
Figure 6:
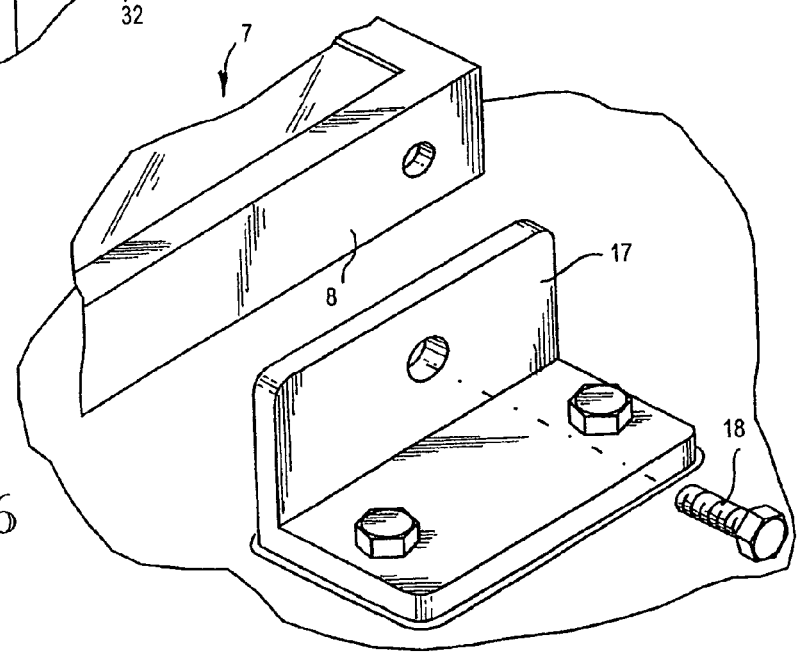
FIG. 6 is an exploded partial perspective view of the pivotal mounting for the solar panel.

Referring to FIG. 1, the solar panel and positioning system 1 is illustrated as being mounted on the roof 2 of a motor vehicle such as a motor home, trailer or the like. The positioning system includes extensible link lift structure 3, lift bar and mast 4, and solar panels 6 and 7. It will be understood that the solar panels 6 and 7 are conventional staples of commerce designed for converting solar energy into electrical energy. In FIG. 1, the particular solar panels illustrated are generally flat and rectangular in configuration. The panels comprise solar cells located in a central area surrounded by rectangular support frames 8 and 9 respectively, giving the panel dimensional stability. As illustrated in FIG. 1, the solar panels are mounted for rotation about respective lateral edges 11 and 12 by means of pivot brackets 13-14 and 16-17 respectively. The solar panels are mounted for rotation about a common axis along aligned lateral edges 11 and 12 respectively by means such as bolts or studs 18. Their relationship is shown in detail in FIG. 6. The solar panels 6 and 7 are illustrated in their non-use position in FIG. 1 and will be raised to the in-use position in the direction of the arrows in FIG. 1 as they are rotated about the axes provided by the pivot bolts 18.

In the present illustrated embodiments, the panels 6 and 7 may be joined together by the elongated angle lift bar 19 which may be constructed from lightweight material such as aluminum. The lift bar 19 is securely fastened to the lateral edges of the panels 6 and 7 opposite the pivoted lateral edges 11 and 12 as shown in FIG. 1. While two such solar panels 6 and 7 are illustrated in the present embodiment, it will be understood that the present panel positioning apparatus may also be applied to a single panel or an array of panels in excess of the two shown. The lift bar 19 is provided with an upstanding U-shaped mast 21 located in the central portion of the lift bar between the solar panels 6 and 7. The mast 21 may be bolted or otherwise securely and rigidly mounted to the lift bar 19 as shown in detail in FIG. 2.

Figure 2:
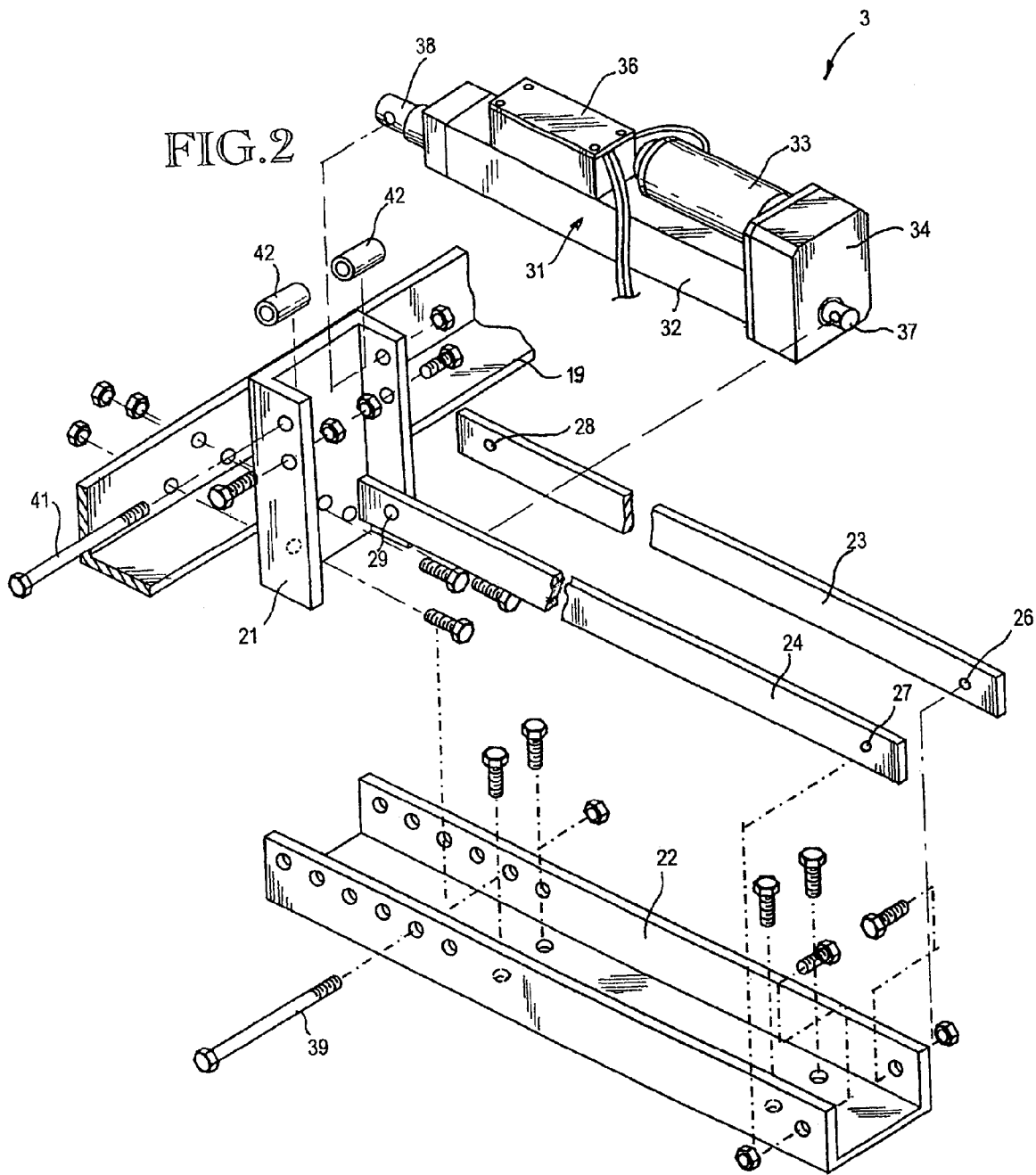
FIG. 2 is an exploded perspective view of the panel positioning mechanism.
Figure 3:
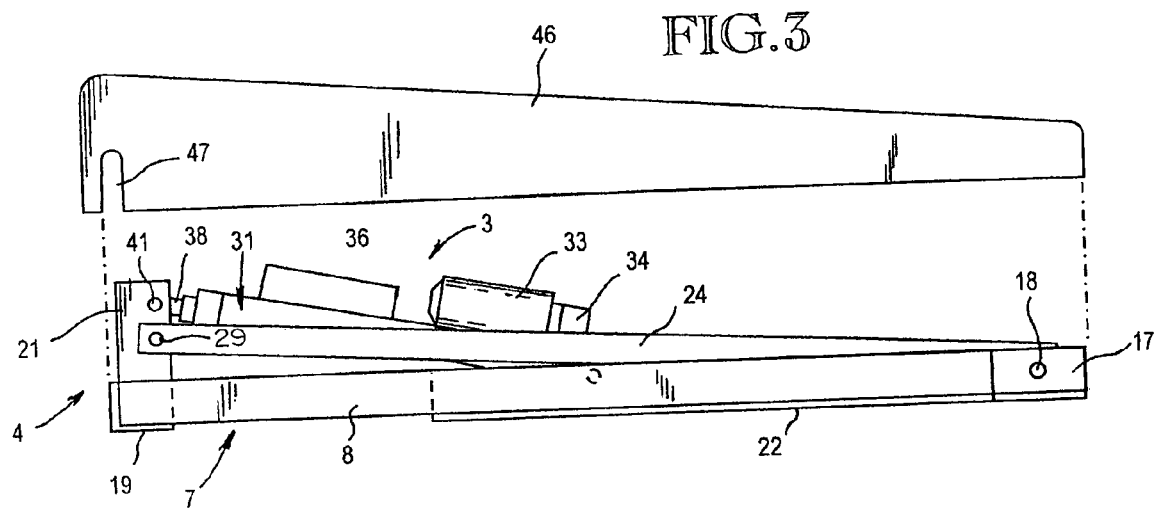
FIG. 3 is a side elevational view of the panel positioning system in the lowered non-use position.
Figure 4:
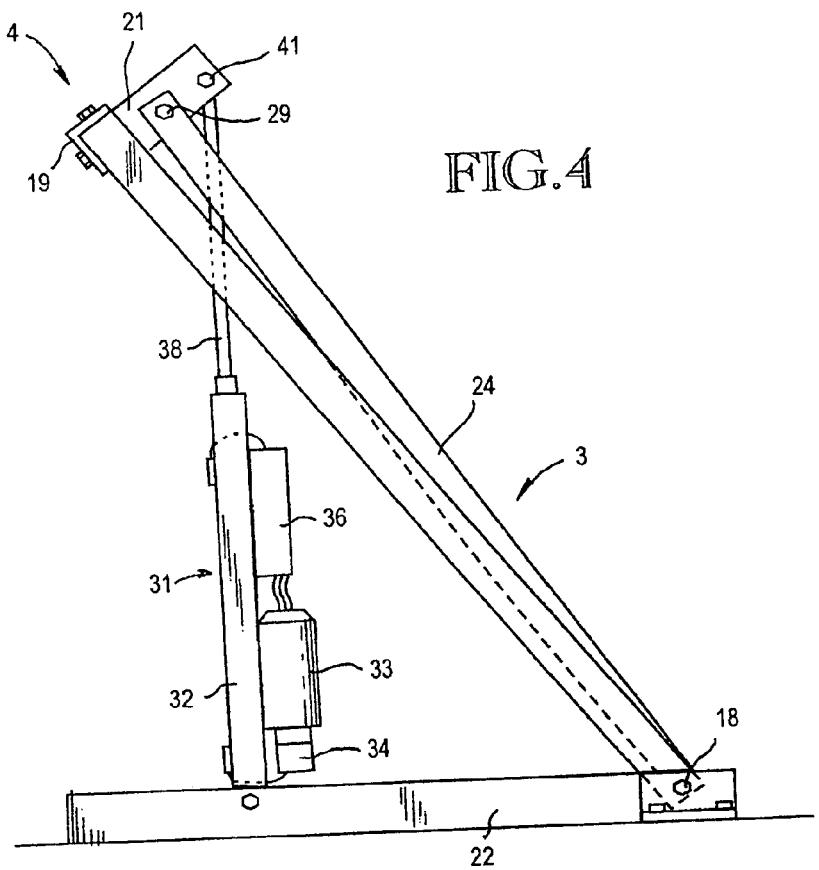
FIG. 4 is a side elevational view of the panel and positioning system in the raised or tilt in-use position.

Power lift structure and linkage 3 comprises a U-shaped channel base 22 which may be constructed from aluminum channel stock or the like and is securely attached to the surface of roof 2 of the vehicle by bolting or the like as shown in detail in FIG. 2. The channel 22 as seen in FIG. 1 is located between the two solar panels 6-7 and parallel to the end edges thereof with one end extending to the pivoted edges 11 and 12 of the solar panels in the illustrated embodiment. The base is connected to the mast 21 by means of one or more swing arms or links 23-24. The links 23 and 24 are pivotally connected to the sides of the U-shaped channel 22 as at 26 and 27 respectively as shown in detail in FIG. 2. The opposite ends of the links 23 and 24 are pivoted to the mast 21 as at the points 28 and 29 respectively. It is to be noted that the pivotal axis provided by the pivot points 26 and 27 are aligned and coincident with the pivotal axis of the solar panels provided by the bolts 18. In this manner, the relationship between the solar panels and the swing arms 23 and 24 remains constant as illustrated in FIGS. 3 and 4 as the solar panels are raised from the horizontal to an in-use position.

Figure 5:
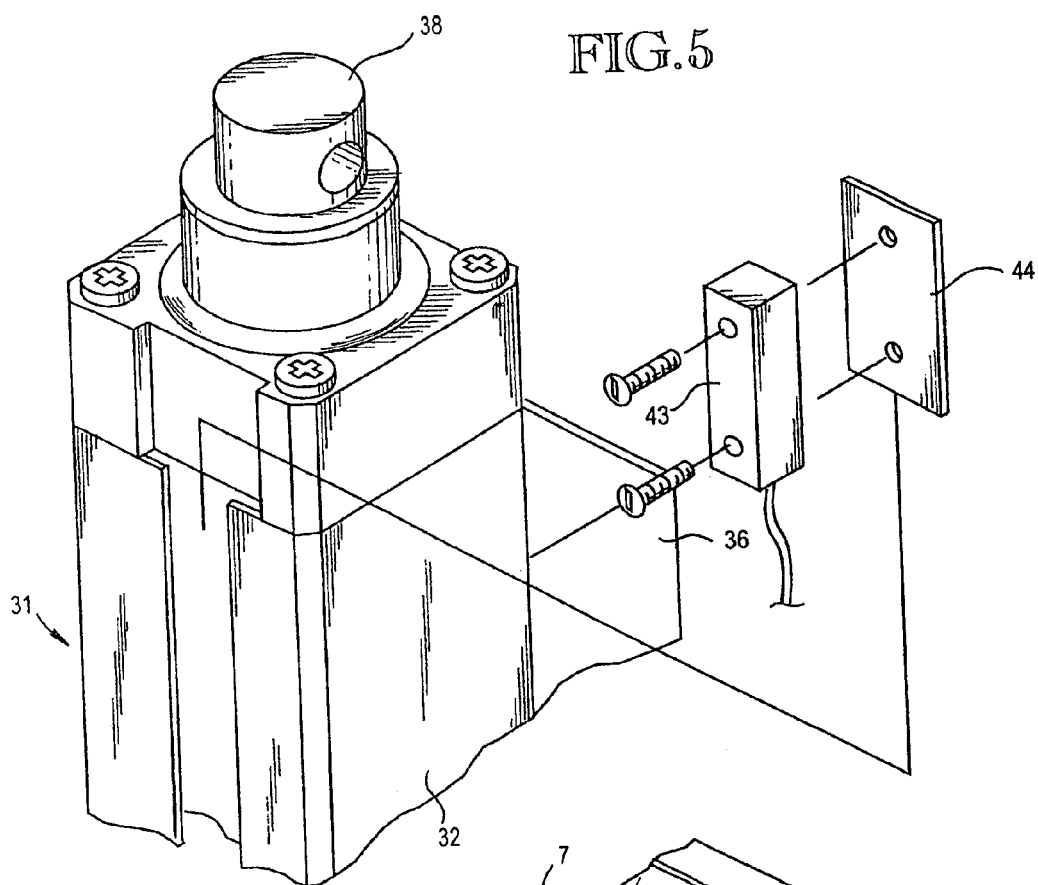
FIG. 5 is an exploded perspective view of an electrical limit switch unit carried on the extensible link.

The lifting action of the power lift structure 3 in the present embodiment is provided by an extensible link in the nature of a screw jack assembly 31 shown in detail in FIGS. 2 and 5. The screw jack may be a commercially available unit such as that manufactured by the Duff Norton Company of Charlotte, N.C. The screw jack structure is well known in the art and usually includes an elongated housing 32, an electric motor 33, a gearing unit 34 connecting the motor drive to the screw element and an electrical switching unit 36 for controlling the operation of the extensible link. Referring to FIGS. 2-4, the housing 32 will be provided with a stationary projecting connector element 37 fixed to the housing for the purpose of pivotally connecting the housing to a base. An extensible screw member within the housing (not shown) is connected to an extensible nonrotatable ram 38. FIGS. 2 and 3 illustrate the ram 38 in the withdrawn position and FIG. 4 illustrates the ram 38 in the extended position which provides the extensible link for the lift structure. As illustrated in FIG. 2 the stationary connector 37 of the screw jack is pivoted to the base structure 22 by means of a pivot bolt or the like 39 which extends through a bore in the connector 37 allowing the entire screw jack assembly to be pivoted relative to the base 22 during lifting. The distal end of the ram 38 is connected to the mast 21 by means of the pivot bolt 41 which passes through a suitable bore in the end of the ram 38 and is held in the centered position by the spacers 42. Similar spacers (not shown) may also be used on the pivot bolt 39 to center the connector 37 between the sides of base 22. In this manner the screw jack extensible link may be operated to move the solar panels 6 and 7 from the horizontal non-use position of FIG. 3 to the in-use position shown in FIG. 4 as the screw jack extends, the solar panels and the swing arms 23 and 24 rotate about the pivotal axis provided by the pivot bolts 18 and the pivots 26 and 27. It is contemplated that the switching unit 36 may be controlled from a remote location either inside or outside of the vehicle through suitable electrical leads and a power source. The retracted and extended positions of the ram 38 may be suitably controlled by limit switches (not shown) located within the screw jack assembly and actuated by position detectors or the like such as that shown at 43 in FIG. 5 mounted at selected locations along the length of the housing 32. The detector 43 may be mounted on a guide plate or the like 44 received in a suitable slotting arrangement on the surface of the housing 32 as shown in FIG. 5. The position limiting switches are normally a part of the commercially available screw jack unit. It will be understood that other means of limiting the extended and retracted positions of the screw jack assembly may also be utilized without departing from the spirit and scope of the invention.

Figure 8:
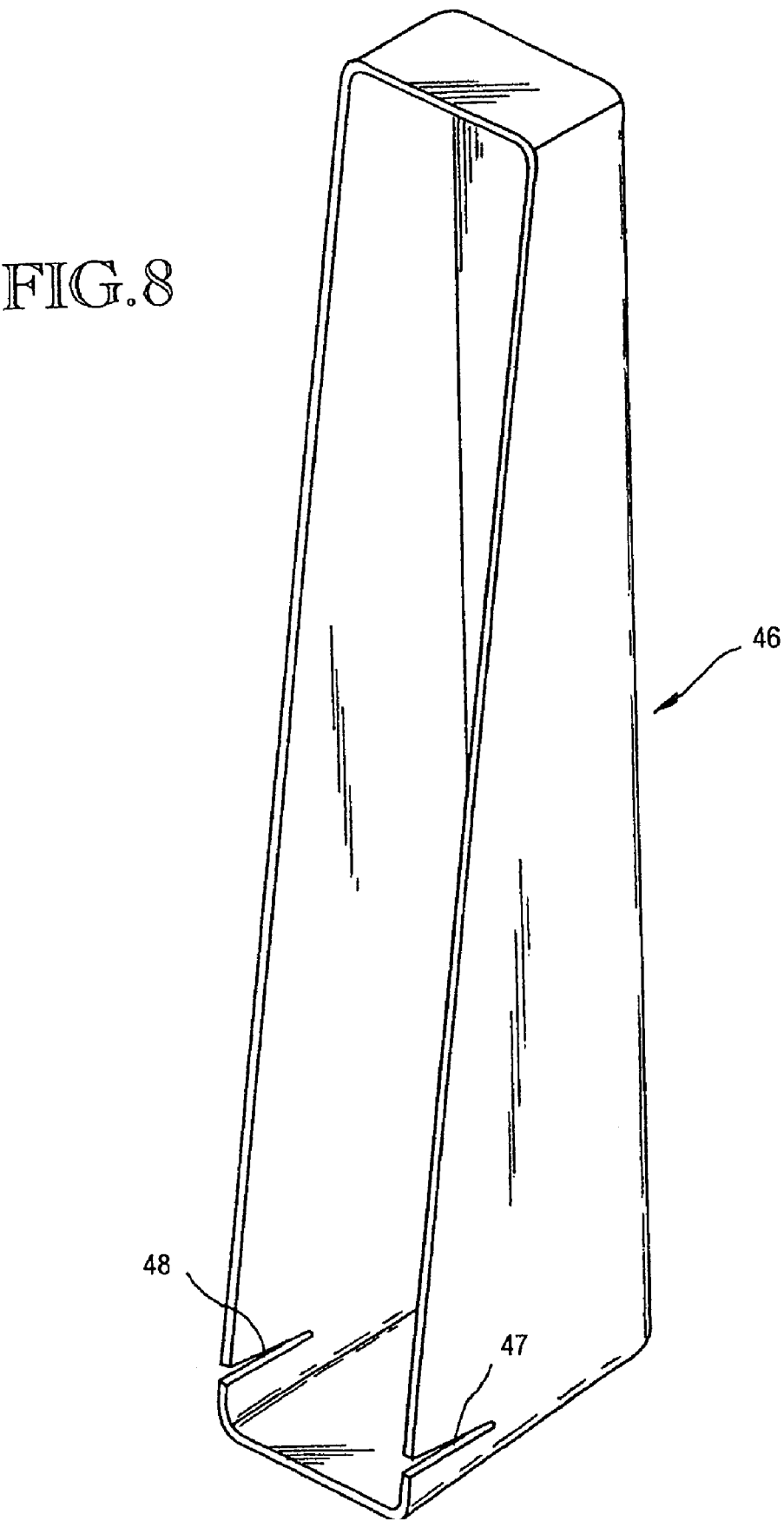
FIG. 8 is a perspective view of a protective cover for the panel positioning linkage apparatus.

Since the power lift structure and linkage is located at an exposed outside location on the vehicle roof surface, it may be desirable to provide a suitable cover or hood to protect the apparatus from the elements. Such a cover 46 is illustrated in FIGS. 3 and 8. The hood may be constructed from metal or molded plastic material and will be designed to cover the mast structure, the base member 22, the power lift and linkage 3, as well as the various pivotal connections. The cover will be provided with waterproof side and top walls and may be fitted over the lift structure and held in place by such means as a pressure or snap fit, clips, bolts or the like. In any event, the protective cover preferably contacts the roof surface with suitable slots 47 and 48 being formed in the opposite forward side walls to accommodate the upstanding flange of the lift bar 19 as illustrated in FIG. 3.

Figure 7:
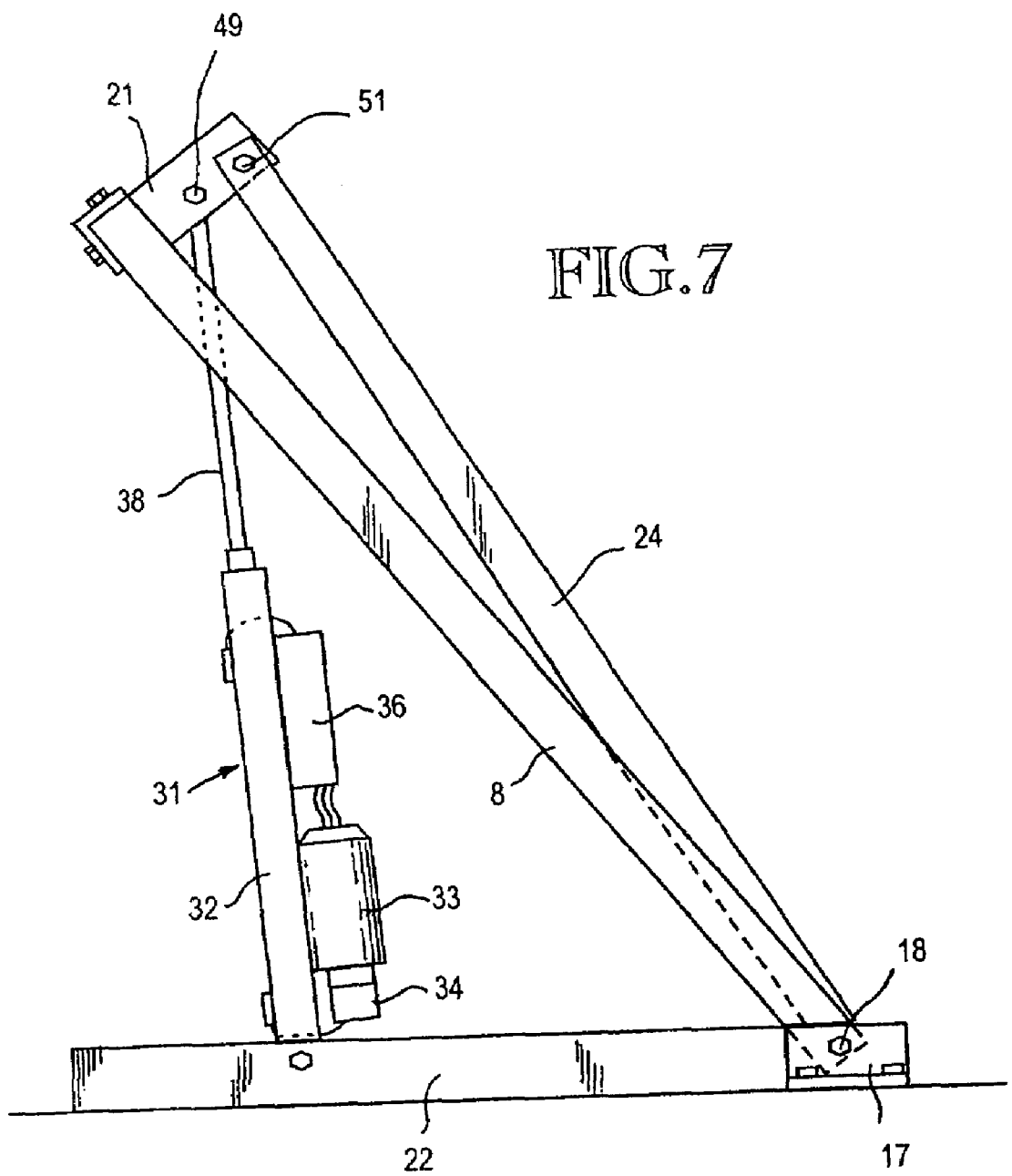
FIG. 7 is a side elevational view of an alternative configuration of the panel positioning linkage apparatus of the FIGS. 1-5 embodiment.

While the embodiment shown in FIGS. 1-4 utilizes a configuration wherein the pivotal connection between the ram 38 of the screw jack and the mast 21 is located above the pivotal connections 28 and 29, in some instances it may be preferable to modify this arrangement. FIG. 7 illustrates a modification of the pivotal arrangement wherein the ram 38 is connected to the mast 21 at a pivot point 49, roughly comparable to the position of the pivot points 28 and 29 of the FIGS. 1-4 embodiment. Links 23 and 24 of this embodiment are connected above the pivot point 49, the pivot point for link 24 being shown at 51 in FIG. 7. The position of pivot point 51 roughly corresponds to the position of pivot point 41 of the ram 38 in the FIGS. 1-4 embodiment. Utilization of the FIG. 7 embodiment wherein the positions of the pivotal connections of the ram 38 and the links 23 and 24 are reversed, may be an advantage in those instances where it is desired to decrease the leverage of the mast 21 against the lift bar 19 to thereby decrease the pressure tending to twist the lift bar. These considerations may be of concern depending on the length of the mast 21.

FIGS. 9-13 illustrate a second embodiment of the panel positioning system constructed for selectively tilting the solar panel or panels either clockwise or counterclockwise about an axis parallel to one or the other of the parallel side edges of the panels. It will be understood that the solar panels may be identical to those described relative to the FIGS. 1-8 embodiment and are conventional staples of commerce designed for converting solar energy into electrical energy. As described, these panels are generally flat and rectangular in configuration and will include a rectangular support frame giving the panels dimensional stability. Although the present embodiment illustrates two such panels 52 and 53, it will be understood that any number of individual solar panels may be utilized or, in the alternative, a single panel may be adapted for use with the positioning mechanism to be described. Although reference will be made to solar panel 52 for the present description, it will be understood that the panel 53 may be identically equipped. In this respect, the panel 52 includes the parallel side frame members 54 and 56 and opposite end frame members 57 and 58. In practice, the solar panel frames may be constructed from light weight aluminum angle iron rigidly connected so as to provide a sturdy dimensionally stable framework.

Figure 9:
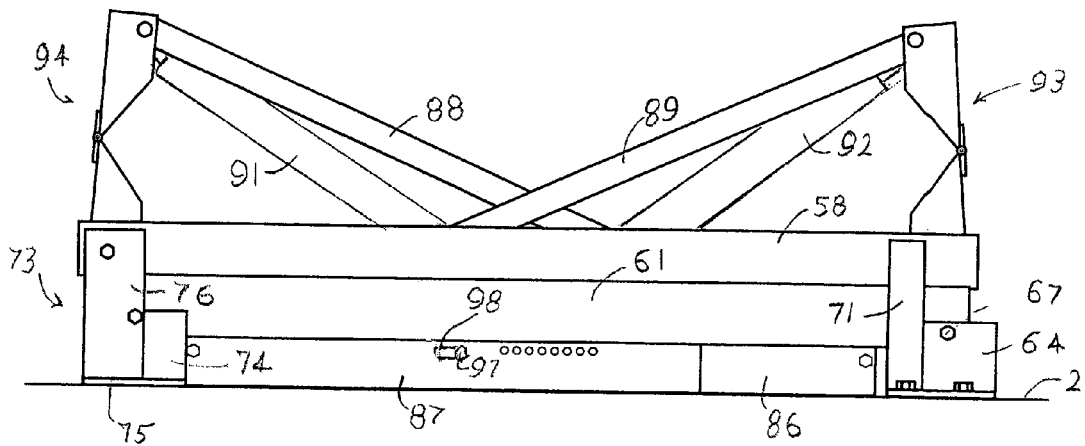
FIG. 9 is an end elevational view of the second embodiment of the dual direction positioning system with the solar panel(s) in the lowered non-use position.
Figure 10:
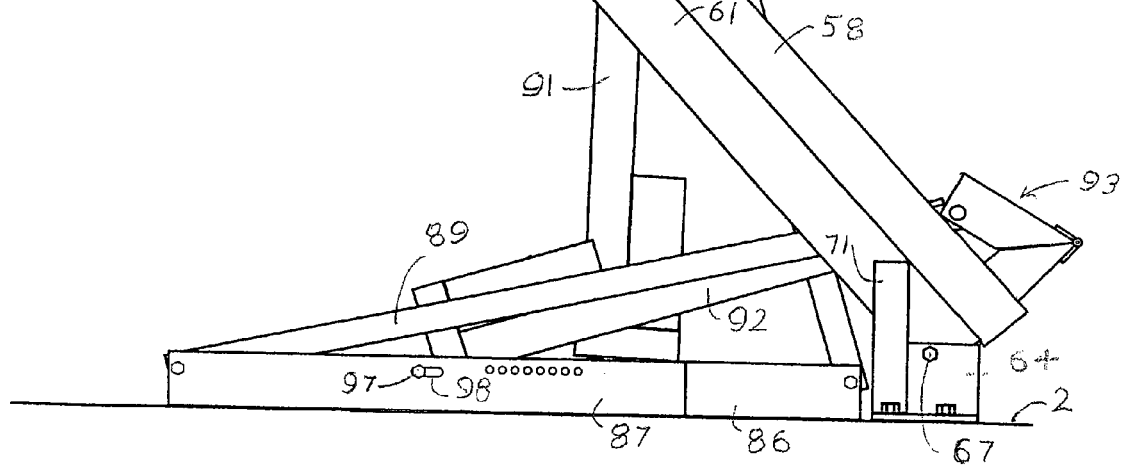
FIG. 10 is an end elevational view of the panel positioning system of FIG. 9 in the right hand or clockwise rotational tilt position of the solar panels.
Figure 11:
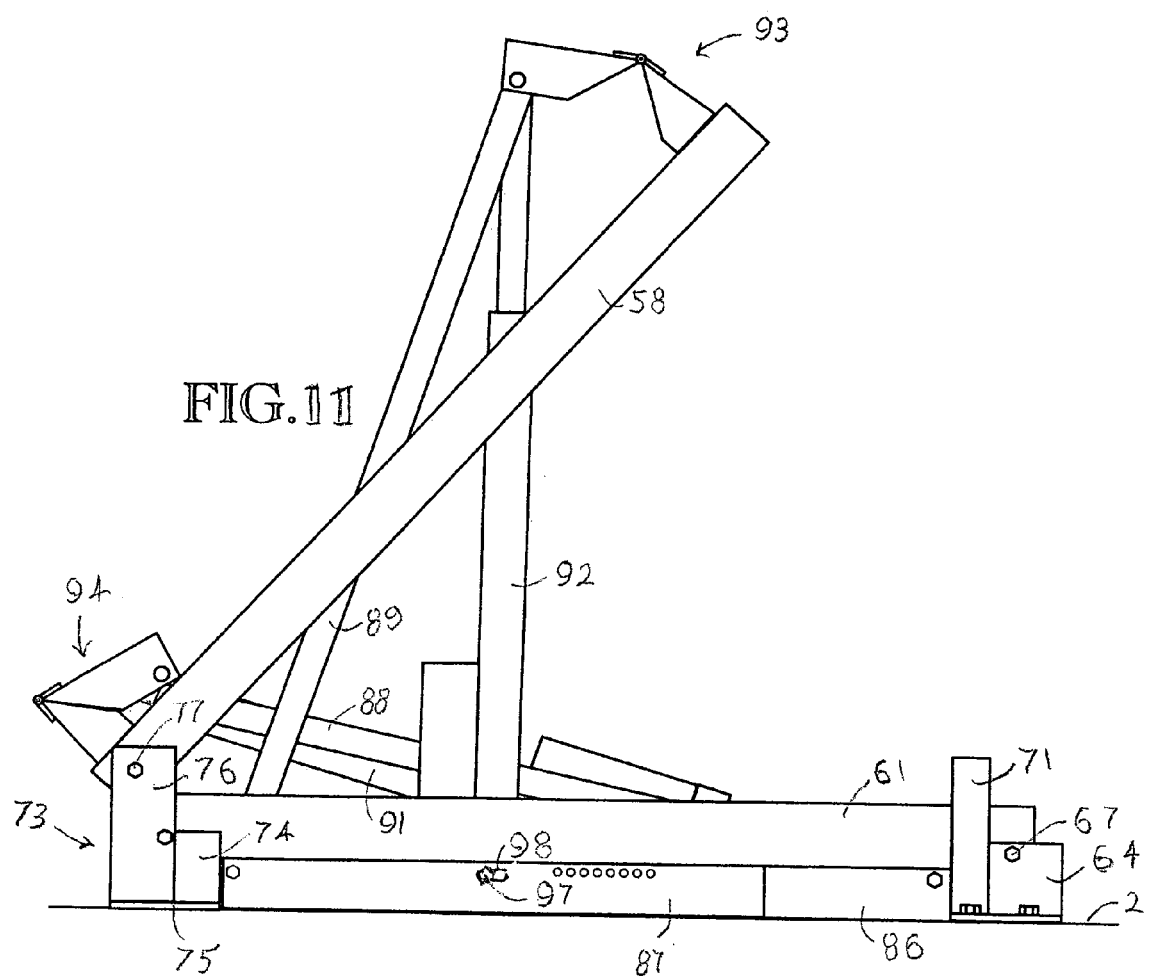
FIG. 11 is an end elevational view of the panel positioning system of FIG. 9 in the left hand or counterclockwise tilt position of the solar panels.
Figure 12:
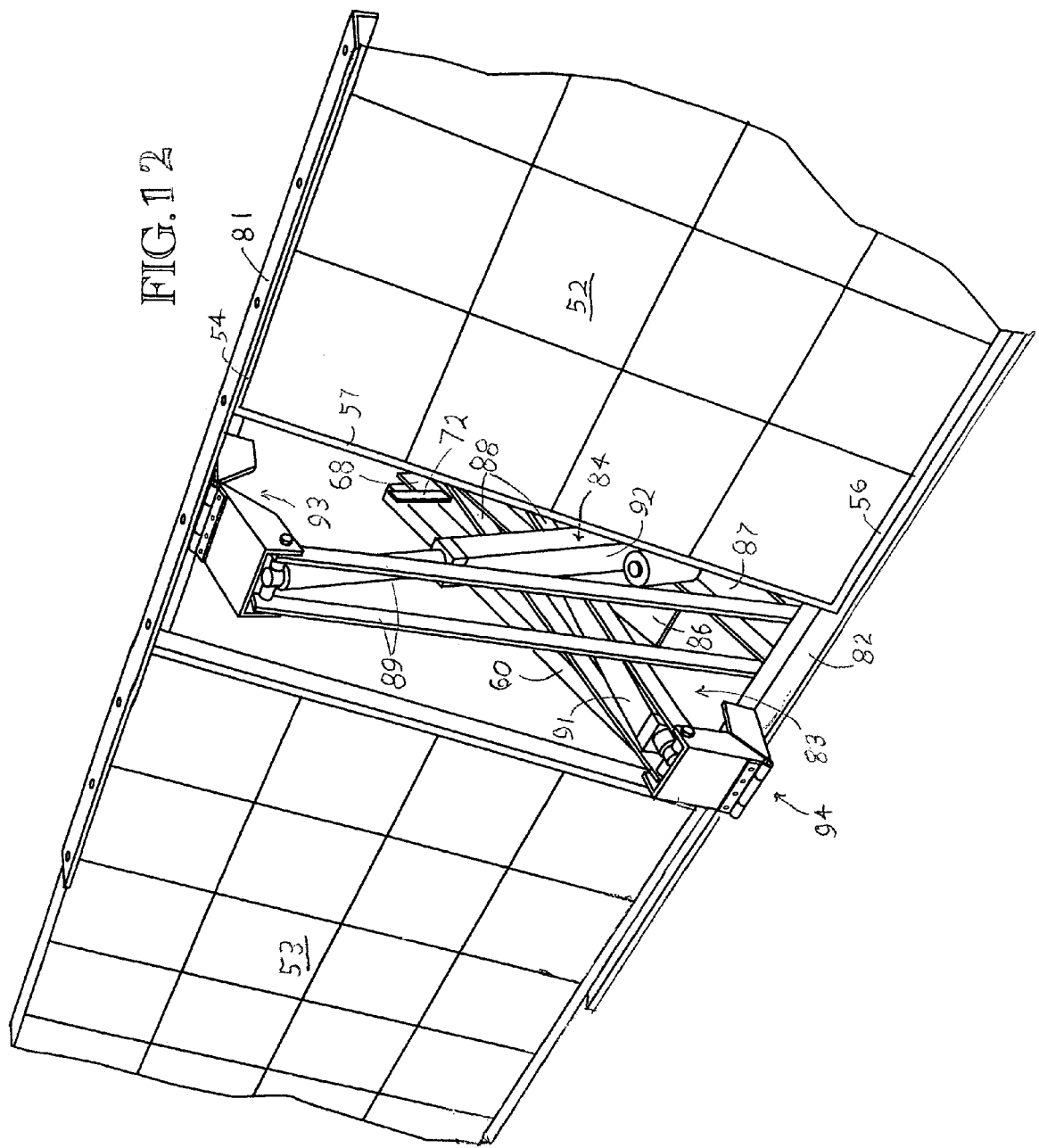
FIG. 12 is a perspective view illustrating the top side of the solar panels and position of the extensible links in the rotational tilt position shown in FIG. 11.
Figure 13:
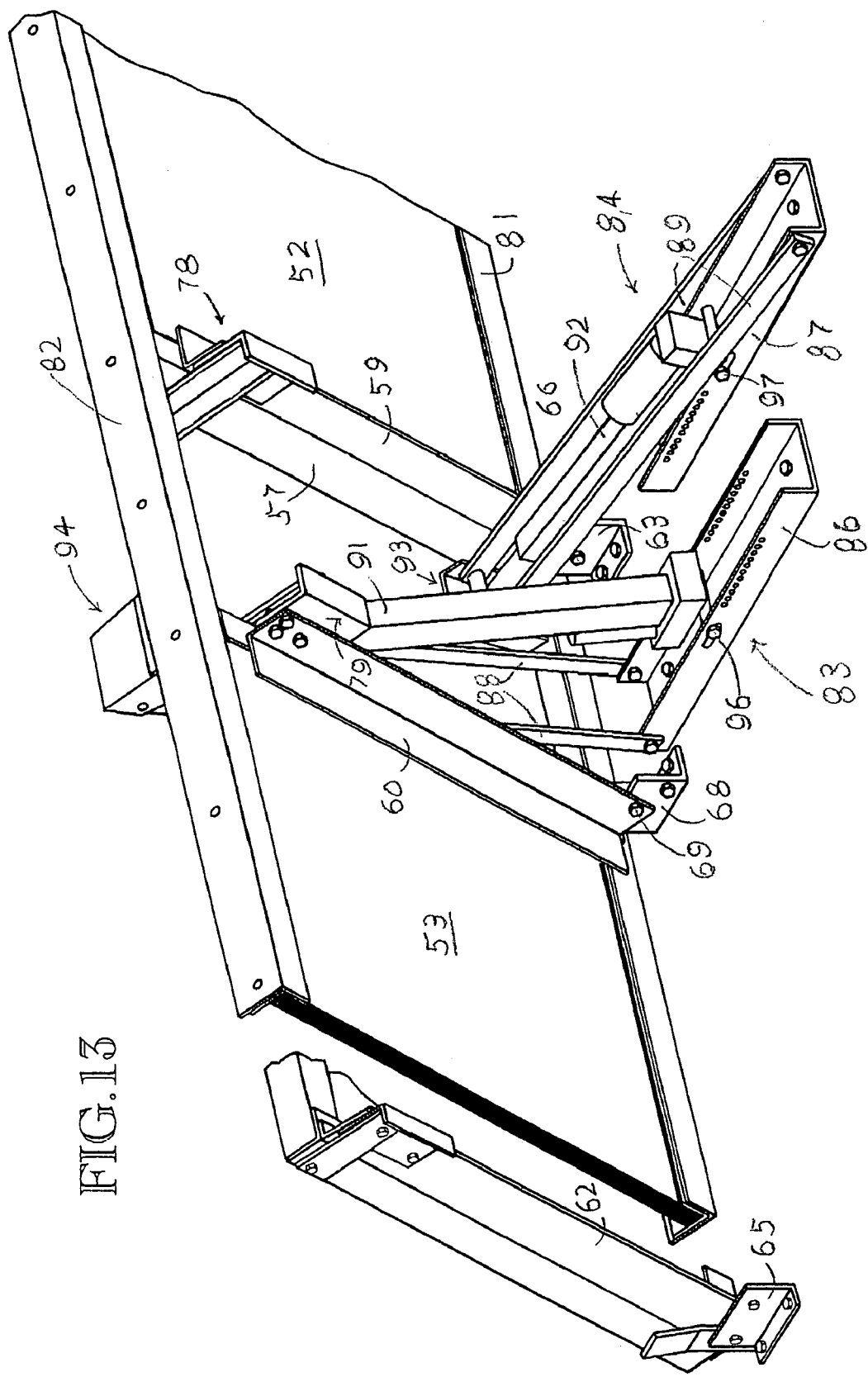
FIG. 13 is a perspective view illustrating the bottom side of the solar panels and position of the extensible links in the rotational tilt position shown in FIG. 10.

In order to provide the dual pivoting function, each end of each panel in the present illustrated embodiment is provided with a transversely directed support rail such as the rails 59 and 61 which contact and support the end frame members 57 and 58 respectively of the solar panel 52. In the description of the panel positioning and support structure, it will be understood that the structure described relative to the panel 52 also applies to the panel 53 as evident from the drawings in FIGS. 12 and 13. Support rails 60 and 62 for panel 53 are shown in FIGS. 12 and 13 of the drawings. The support rails 59 and 61 are pivotally attached at one end to stationary mounting brackets 63 and 64 respectively by means such as the pivot bolts 66 and 67 respectively. Likewise, the transverse support rail 60 for panel 53 will be pivotally attached to stationary mounting brackets such as the bracket 68 by means of the pivot bolt or axle 69. The support rail 62 at the opposite end of the panel 53 will also be provided with a stationary mounting bracket 65 providing a pivot point for the support rail. As seen in the drawings, the stationary mounting brackets 63 and 64, as well as the mounting brackets 65 and 68 for the second solar panel 53, will be bolted or otherwise firmly attached to a mounting surface such as the top panel or roof of the motor home or the like 2 as illustrated in FIGS. 9-11. Each of the stationary mounting brackets may be provided with an upstanding guide, either integral with or separately attached thereto, such as the upstanding guide bar 71 fixed to the mounting bracket 64 and the upstanding guide 72 attached to the mounting bracket 68 as shown in FIG. 12. The guide bars or posts 71 and 72 will function to maintain the associated solar panel frame member in alignment with its underlying support rail and will provide stability for the panel frame in position on top of the associated support rail.

As seen most clearly in FIGS. 9-11, the transverse support rails 59-62 on each end of each solar panel are provided with pivotal mounting brackets fixed to the ends of the support rails opposite the stationary mounting brackets 63 and 64 on the panel 52 as well as the brackets 65 and 68 on the support rails on the second panel 53. The mounting brackets on the two panels may be identical in detail hence, for descriptive purposes, only the mounting bracket for panel 52 will be described. As illustrated in FIGS. 9-11 the mounting bracket 73 on the outboard end of the support rail 61 includes an angled base plate 74 and an upstanding pivot arm 76 both of which are fixedly mounted on the outside surface of the support rail 61. The configuration of this structure may be varied, however, and it may be constructed from a unitary piece. The bracket 73 provides a pivotal axis for one end of the frame of the panel 52 when moving the solar panel(s) to the operative position as shown in FIG. 11 and includes a support plate or flange 75 to support the end of the rail 61 at the same elevation as the opposite end at the mounting bracket 64. When the panel is moved in the opposite direction of tilt about the axis of bolts 67, 66, 69, the mounting bracket 73 will, of course, be raised along with the outboard end of support rails 59 and 60 which are provided with similar mounting bracket assemblies 78 and 79 respectively as shown in FIG. 13. The assemblies 78 and 79 may be identical in detail and mirror images to provide the pivot and support functions for the adjacent ends of the panels 52 and 53 as described with respect to the bracket assembly 73. It is to be noted that the pivotal axis provided by the pivot bolts 66-67 for the panel 52, as well as the pivot bolts for the panel 53, are all in alignment, providing a single pivot axis for the panels 52 and 53 for rotational tilting of the panels to the operative position shown in FIG. 10. Likewise, the pivot bolts on the opposite sides of the solar panel frame members are all aligned to permit the pivoting of the panels in unison in the counterclockwise direction to the operative position shown in FIG. 11.

Referring to FIGS. 12 and 13, adjacent solar panels 52 and 53, along with their associated frames, are connected in-line by lift bars 81 and 82 which may be angle stock constructed from aluminum or any other suitable material. The lift bars 81 and 82 will be rigidly connected to the solar panel frames as illustrated in order for the panels to be moved and tilted in unison. In order to provide for bi-directional tilting of the solar panels, independent power lift assemblies and linkages 83 and 84 may be located in appropriate spacing between the panels 52 and 53 as illustrated in FIGS. 12 and 13. The lift assemblies 83 and 84 include U-shaped base channels 86 and 87 respectively, rigidly connected to the support surface 2; laterally spaced pairs of swing links 88 and 89 connected between one end of the associated base channel and an articulated mast structure which is in turn connected to an associated lift bar, presently to be described; and screw jacks 91 and 92 pivotally connected between associated mast assemblies and U-shaped channel bases as illustrated.

The lift bars 81 and 82 are provided with upstanding articulated mast structures 93 and 94 respectively for connection to the power lift structures 84 and 83 respectively so as to accomplish tilting of the solar panels, either clockwise or counterclockwise, about axes parallel to the opposite lateral edges thereof as illustrated in FIGS. 10 and 11. Referring to the drawings, each articulated mast comprises essentially two hinged plates, one being rigidly attached to an associated lift bar and the other being pivotally connected to an associated screw jack and swing link arrangement. These plates are hinged so as to accommodate horizontal positioning of the solar panel frames when both power links 91 and 92 are completely withdrawn, as shown in FIG. 9, and to move to a closed position to permit tilting of the solar panels about a lateral edge in either direction as illustrated in FIGS. 10 and 11. With this arrangement, only one of the power links 91 or 92 needs to be actuated at any given time, depending upon the desired direction of rotational tilt of the panels. The other power link may remain rigid with the associated articulated mast accommodating the increase in distance between the fixed plate of the mast and the associated power link. In the present embodiment, the hinged plates of the articulated mast are constructed in the form of U-shaped channels, the edges of the flanges being inclined adjacent the hinged end so as to permit the required closure of the articulated mast. This relationship is shown in FIGS. 10 and 11. It will be understood that the detailed configuration of the mast structures and their connection to the power links may be altered along with the structural details of the power links without departing from the scope of the invention. For instance, the hinged plates could be flat plate members and/or provision could be made for extending the reach of the associated power link to accommodate the geometry so as to permit tilting of the solar panels in either direction. In the present embodiment, it will be noted that the power links 91 and 92 are provided with pivotal connections, as at bolts 96 and 97 respectively, to the upstanding flanges of the associated base channels. These pivotal connections may be provided with a slotted opening, such as the slot 98 in the flanges of the channel base 87 as shown in FIGS. 9-11, to permit a certain amount of movement of the pivot 97 if necessary as the solar panels are moved through their clockwise or counterclockwise tilting motion. The amount of movement, if any is required, will vary depending on the dimensions of the links and placement of pivot points. It will be understood, of course, that slots such as the slot 98 may be used to mount all of the pivot bolts which connect the power links to the associated channel bases.

The operation and control of the individual screw jack units 91 and 92 may be the same as that described for the screw jack unit 31 with a suitable control system therefor such as described relative to the FIGS. 1-5 embodiment. Likewise, a cover or hood such as the cover 46, described relative to FIG. 8, may be suitably mounted on the lift bars 81 and 82 so as to protect the lift assemblies from the elements. It will also be understood that a single solar panel may be mounted for bidirectional tilt, either with both lift assemblies located at one end of the solar panel as illustrated or with a lift assembly locate at the opposite ends of the panel without departing from the intended scope of the invention.

Although the present invention has been described with reference to the preferred embodiments, it will be apparent that alternative structural or mechanical details may be employed in order to accomplish the objects of the invention. As an example, different types of extensible link assemblies may be utilized such as pneumatic or hydraulic rams with various arrangements of limit switches and the like for limiting the movement of the solar panels. Various configurations of protective covers may be utilized and various materials of construction employed for the various linkages and pivotal connections. Still other modifications of remote control and electrical power sources for the extensible link may be utilized to raise and lower the solar panels from remote locations.

What is claimed is:

1. Positioning apparatus for a support surface mounted solar energy system including a lift structure attached to at least one pivotal axis mounted solar panel, said pivotal axis extending along one lateral edge of the panel, said apparatus comprising;

an upstanding mast attached to said solar panel, said mast being spaced from the solar panel pivotal axis and extending away from the support surface, a base structure mounted on the support surface and extending transversely to the solar panel pivotal axis, at least one swing link connected at one end thereof to said mast and the opposite end mounted in pivotal relation to the base structure, and an extensible link pivotally connected between the mast and an intermediate point on the base structure between the mast and the solar panel pivotal axis.

2. Positioning apparatus for a solar energy system mounted on a support surface in generally parallel relation thereto, comprising;

a lift bar attached to a first lateral edge of at least one generally planar solar panel, said at least one solar panel having a second opposite parallel lateral edge mounted on a first pivotal axis for orientation of said panel at an angle to the support surface, an upstanding mast connected to the lift bar and extending away from the support surface, a base structure mounted on the support surface adjacent said at least one solar panel, at least one swing link having a pivotal connection at one end to the base structure for movement about a second pivotal axis in alignment with said first pivotal axis, the opposite end thereof being connected to the mast, and an extensible link pivotally connected at one end to the mast and at the opposite end to the base structure at a point between said swing link pivotal connection and the mast, whereby, upon extension of the extensible link, the lift bar is moved away from the support surface and said at least one solar panel is moved about said first pivotal axis to a position at an angle to the support surface.

3. The apparatus of claim 2 including;

pivot bracket means fixed to the support surface, the opposite lateral edge of said at least one solar panel being connected to said pivot bracket means defining said first pivotal axis.

4. The apparatus of claim 3 wherein the base structure is fixed to the support surface and includes a terminal end portion with means comprising said second pivotal axis, the base structure extending along an edge of said at least one solar panel at right angles to said first and second lateral edges.

5. The apparatus of claim 4 including a plurality of said solar panels;

said solar panels being spaced along the length of the lift bar, and said apparatus further including a plurality of said swing links with each swing link being connected to the mast and pivoted about an axis in alignment with said first and second axes.

6. The apparatus of claim 5 wherein the mast has a terminal end portion spaced from the lift bar, each said swing links being connected to the mast adjacent said terminal end, and said extensible link being pivotally connected to the mast at a point between the swing link connection point and the lift bar.

7. The apparatus of claim 5 wherein said mast has a terminal end portion spaced from said lift bar, said extensible link being pivotally connected to the mast adjacent said terminal end, and each said swing links being connected to the mast at a point between the extensible link connection and the lift bar.

8. The apparatus of claim 2 wherein the support surface comprises the roof section of a mobile vehicle;

said extensible link comprising a motor powered unit, and remote control means for selectively actuating said motor powered unit to control the orientation of said solar panels relative to the roof section.

9. The apparatus of claim 5 wherein the support surface comprises the roof section of a mobile vehicle, said extensible link comprising a motor powered unit, and remote control means for selectively actuating said motor powered unit to control the orientation of said solar panels relative to the roof section.

10. Solar panel positioning apparatus for controlling the tilt angle of a support surface mounted solar panel, said panel having opposed lateral side edges, comprising in combination;

mounting means on said support surface for mounting said panel for selective alternate clockwise and counter clockwise rotation about pivotal axes parallel to said lateral edges respectively, first and second extensible lift assemblies connected between said support surface and the lateral edges of said panel respectively for rotating said panel alternately about said axes, and means for selectively alternately actuating said lift assemblies to control the tilt angle of said panel relative to said support surface.

11. The apparatus of claim 10 wherein said mounting means includes;

at least one transverse support rail for supporting said panel, bracket means fixed to said support surface for pivotally connecting one end of said support rail thereto for rotation of the panel in one direction about one said pivotal axes associated with one lateral edge of said panel, the opposite end of said support rail being pivotally connected to the other lateral edge of the panel for rotation of the panel in the opposite direction about the other said pivotal axes.

12. The apparatus of claim 10 wherein said support surface comprises a transport vehicle having a generally horizontal roof section.

13. The apparatus of claim 12 wherein said vehicle comprises a motor home.

14. Solar panel positioning apparatus for controlling the tilt angle of a generally rectangular support surface mounted solar panel having opposed lateral side edges, comprising;

mounting structure mounting said panel on said support surface for alternate pivotal movement clockwise and counter clockwise about first and second pivotal axes parallel and adjacent to said respective lateral side edges, first and second upstanding mast structures connected to the respective panel lateral side edges associated with said first and second pivotal axes respectively, each said mast structures extending away from said support surface, first and second base structures fixed to said support surface adjacent said first and second mast structures respectively, said base structures extending transversely of said panel, and first and second extensible lift assemblies connected between said first and second base structures respectively and the first and second mast structures respectively, whereby actuation of said first lift assembly rotates said panel about one of said pivotal axes in a first direction of rotation and alternate actuation of said second lift assembly rotates the panel about the other of said pivotal axes in a second opposite direction of rotation.

15. The apparatus of claim 14 wherein said mounting structure comprises;

at least one transverse support rail for supporting said panel bracket means fixed to said support surface for pivotally connecting one end of said support rail thereto for rotation of the panel in one direction about one said pivotal axes associated with one lateral edge of said panel, the opposite end of said support rail being pivotally connected to the other lateral edge of the panel for rotation of the panel in the opposite direction about the other said pivotal axes.

16. The apparatus of claim 14 including;

swing link means extending between and pivotally connected to the base structure and mast structure associated with each said extensible lift assemblies, said lift assemblies being connected to the associated base structure at an intermediate point on the base structure between the associated mast and the associated swing link pivotal connection.

17. The apparatus of claim 16 wherein said lift assemblies are connected to the associated base structures by means of a pivot pin and slot connection permitting a predetermined displacement of the pivot pin during raising and lowering the panel.

18. The apparatus of claim 16 wherein each said mast structure comprises;

a two part articulated hinged member having one part thereof fixed relative to one associated edge of said panel, the other part thereof being pivotally connected to the associated extensible lift assembly and swing link means, whereby articulation of said mast members accommodates alternate rotation of the panel about said pivotal axes in the clockwise and counter clockwise directions from a horizontal position to preselected tilt positions.

19. The apparatus of claim 16 including;

a second spaced coplanar solar panel having opposed lateral edges, mounting structure for mounting said second solar panel on said support surface for alternate pivotal movement clockwise and counter clockwise about said first and second pivotal axes, lift bar means connecting the associated opposed lateral edge of said coplanar panels, said first and second mast structures being connected to the respective lift bar means, whereby said coplanar panels are tilted in unison by said lift assemblies.

20. Positioning apparatus for a support-surface-mounted solar energy system including a lift structure attached to at least one solar panel, said solar panel having a first peripheral edge pivotally connected to the support surface along a pivotal axis, said positioning apparatus comprising;

an upstanding mast attached to said solar panel, said mast being located on a second peripheral edge of said panel opposite from the solar panel pivotal axis, said mast extending at substantially right angles to the general plane of the solar panel surface and in a direction away from the support surface, a base structure mounted on the support surface and extending transversely to the solar panel pivotal axis, at least one swing link connected at one end thereof to said mast and at the opposite end in pivotal relation to the base structure on an axis coincident with the solar panel pivotal axis, and an extensible link pivotally connected between the mast and an intermediate point on the base structure spaced from the solar panel pivotal axis.

21. Positioning apparatus for a solar energy system having at least one generally rectangular solar panel for solar ray collection mounted on a support surface in a generally horizontal parallel position relative thereto, comprising;

a lift bar attached to a first lateral edge of said at least one solar panel, said at least one solar panel having a second opposite lateral edge mounted on a first pivotal axis for orientation of said panel between a lowered generally horizontal position and a raised solar ray collection position at an angle to the support surface, an upstanding mast connected to the lift bar and extending at substantially right angles to the general plane of the solar panel surface and in a direction away from the support surface, a base structure mounted on the support surface adjacent said at least one solar panel and extending transversely to said first pivotal axis, at least one swing link having a pivotal connection at one end to the base structure for movement about a second pivotal axis in alignment with said first pivotal axis, the opposite end thereof being connected to the mast, and an extensible link pivotally connected at one end to the mast and at the opposite end to the base structure at a point between said swing link pivotal connection and the mast, whereby upon extension of the extensible link, the lift bar is moved away from the support surface and said at least one solar panel is moved about said first pivotal axis to a position at an angle to the support surface for collection of solar rays.

22. In a support-surface-mounted solar energy system, said system including a generally rectangular framed solar panel, said frame having a first peripheral edge and a second peripheral edge opposite thereto pivotally mounted on said support surface for movement of said panel about a pivotal axis between a lowered generally horizontal position on said support surface and a raised solar ray collection tilt position, solar panel positioning apparatus comprising;

a mast structure on said first edge of the solar panel frame and extending upwardly at substantially right angles to the panel surface in a direction away from the support surface, an elongated base structure mounted on said support surface and extending transversely to the solar panel pivotal axis, at least one swing link having one end thereof connected to said mast structure and the opposite end mounted in pivotal relation to the base structure on an axis coincident with the solar panel pivotal axis, and a selectively extensible link pivotally connected between the mast structure and an intermediate point on the base structure spaced from the solar panel pivotal axis.

23. The apparatus of claim 22 further including;

a plurality of spaced framed solar panels mounted for rotation about said pivotal axis, and lift bar means connecting said solar panels along lateral peripheral edges thereof opposed to said pivotal axis, said mast structure being connected to said lift bar between adjacent solar panels.

24. In a support-surface-mounted solar energy system, said system including a generally rectangular framed solar panel, solar panel positioning apparatus for controlling the tilt angle of said solar panel about alternate axes between a generally horizontal position on said support surface and alternate solar ray collection positions about said alternate axes relative to said support surface, said panel having opposed lateral side edges, comprising in combination;

mounting means on said support surface for mounting said panel for selective alternate clockwise and counterclockwise rotation about independent axes located parallel and adjacent to said lateral edges respectively, the axis of rotation in either direction being stationary and located closely adjacent to the support surface during rotation thereabout, first and second extensible lift assemblies connected between said support surface and the lateral edges of said panel respectively for selectively rotating said panel alternately about said axes, and means for selectively alternately actuating said lift assemblies to control the tilt angle of said panel alternately about said pivotal axes relative to said support surface.

25. A solar ray collection system for collecting solar energy rays at an angle to a support surface comprising;

a solar ray collection panel having a generally rectangular panel frame pivotally mounted on said support surface for movement between a lowered position on said support surface and raised tilt positions alternately in opposite directions for solar ray collection, said frame having generally parallel opposed lateral side edges, mounting structure mounting said panel frame on said support surface for alternate pivotal movement clockwise and counter clockwise about first and second independent pivotal axes parallel and adjacent to said respective lateral side edges, first and second mast structures connected to the panel frame lateral side edges and extending upwardly therefrom at substantially right angles to the surface of said panel and in a direction away from the support surface, first and second base structures fixed to said support surface adjacent said first and second mast structures respectively, said base structures extending transversely to said pivotal axes, and first and second extensible lift assemblies connected between said first and second base structures respectively and said first and second mast structures respectively, whereby, actuation of said first lift assembly rotates said panel about one of said pivotal axes in a first direction of rotation to a first tilt position for solar ray collection and alternate actuation of said second lift assembly rotates the panel about the other of said pivotal axes in a second direction of rotation to a second tilt position in the opposite direction for solar ray collection.

\* \* \* \* \*

UNITED STATES PATENT AND TRADEMARK OFFICE
CERTIFICATE OF CORRECTION

PATENT NO. : 7,513,250 B2  Page 1 of 1
APPLICATION NO. : 11/590519
DATED : April 7, 2009
INVENTOR(S) : Ray Head and Cindy S. Head It is certified that error appears in the above-identified patent and that said Letters Patent is hereby corrected as shown below:

Col. 9, Claim 8, line 5, insert --at least on-- after "said"

Col. 9, Claim 8, line 6, change "panels" to read --panel--

Col. 10, Claim 15, line 3, insert a comma --,-- after "panel"

Signed and Sealed this

Ninth Day of June, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,513,250 B2 | |
| APPLICATION NO. | : 11/590519 | |
| DATED | : April 7, 2009 | |
| INVENTOR(S) | : Ray Head and Cindy S. Head | |

It is certified that error appears in the above-identified patent and that said Letters Patent is hereby corrected as shown below:

Col. 9, Claim 8, line 9, insert --at least on-- after "said"

Col. 9, Claim 8, line 10, change "panels" to read --panel--

Col. 10, Claim 15, line 12, insert a comma --,-- after "panel"

This certificate supersedes the Certificate of Correction issued June 9, 2009.

Signed and Sealed this

Seventh Day of July, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,513,250 B2 | Page 1 of 1 |
| APPLICATION NO. | : 11/590519 | |
| DATED | : April 7, 2009 | |
| INVENTOR(S) | : Ray Head and Cindy S. Head | |

It is certified that error appears in the above-identified patent and that said Letters Patent is hereby corrected as shown below:

Col. 9, Claim 8, line 9, insert --at least one-- after "said"

Col. 9, Claim 8, line 10, change "panels" to read --panel--

Col. 10, Claim 15, line 12, insert a comma --,-- after "panel"

This certificate supersedes the Certificates of Correction issued June 9, 2009 and July 7, 2009.

Signed and Sealed this

Eighteenth Day of August, 2009

David J. Kappos
*Director of the United States Patent and Trademark Office*